United States Patent Office 3,830,826
Patented Aug. 20, 1974

3,830,826
2-ACYL-5-NITROTHIAZOLE DERIVATIVES
Peter Strehlke, Eberhard Schroder, and Hans-Joachim Kessler, Berlin, Germany, assignors to Schering Aktiengesellschaft, Berlin, Germany
No Drawing. Filed June 23, 1972, Ser. No. 265,462
Claims priority, application Germany, Jan. 27, 1972, P 22 04 364.7
Int. Cl. C07d 11/32
U.S. Cl. 260—302 H
44 Claims

ABSTRACT OF THE DISCLOSURE 2-acyl-5-nitrothiazoles of the formula

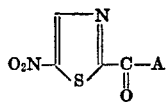

wherein A is furyl, thienyl, or pyrrolyl, which can be substituted by one or more alkyl groups or by phenyl; or a group of the formula

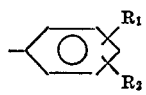

wherein $R_1$ is hydrogen, halogen, straight or branched chain alkyl, hydroxyl, alkoxy, phenoxy, alkylmercapto, phenylmercapto, phenyl or phenylalkyl; and $R_2$ is hydrogen, halogen, straight or branched chain alkyl, hydroxyl, or alkoxy. These compounds are useful as fungicides and as intermediates in the preparation of other pharmaceutically active compounds.

BACKGROUND OF THE INVENTION

Field of the Invention

This invention relates to 2-acyl-5-nitrothiazoles and to processes for their preparation and use.

Description of the Prior Art 5-nitrothiazole derivatives substituted in the 2-position which are useful antibacterial agents have been described in the prior art, e.g., Antibiotics and Chemotherapy 5, 540 (1955) and in J. Med. Chem. 12:303 (1969). While suitable for many uses, these compounds exhibit relatively poor antifungal activity and are of limited use as intermediates for the preparation of other biochemically active compounds therefrom.

OBJECTS OF THE INVENTION

Accordingly, it is an object of this invention to provide novel 2-acyl-5-nitrothiazoles.

Another object of this invention is to provide processes for preparing 2-acyl-5-nitrothiazoles.

A further object of this invention is to provide fungicidal compounds and compositions and methods for their use.

An additional object of this invention is to provide valuable intermediates in the production of pharmaceuticals.

Upon further study of the specification and appended claims, further objects and advantages of this invention will become apparent to those skilled in the art.

SUMMARY OF THE INVENTION

The above and other objects are attained in one aspect of this invention by providing 2-acyl-5-nitrothiazoles of Formula I

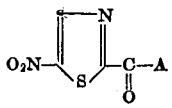

wherein A is furyl, thienyl, or pyrrolyl, which can be substituted by one or more alkyl groups or by phenyl; or a group of Formula II

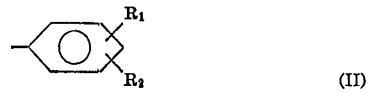

wherein $R_1$ is hydrogen, halogen, straight or branched chain alkyl, hydroxyl, alkoxy, phenoxy, alkylmercapto, phenylmercapto, phenyl or phenylalkyl; and $R_2$ is hydrogen, halogen, straight or branched chain alkyl, hydroxyl, or alkoxy.

Another aspect of this invention relates to a first process for the preparation of the compounds of Formula I which comprises reacting a compound of the formula A—H wherein A has the above-indicated values with an activated derivative of 5-nitrothiazole-2-carboxylic acid in the presence of a Friedel-Crafts catalyst.

In a further aspect, this invention relates to a second process for the preparation of compounds of Formula I wherein A and $R_1$ have the above-indicated values and $R_2$ is hydroxyl, which comprises reacting a compound of Formula II wherein $R_2$ is hydroxy with an activated derivative of 5-nitrothiazole-2-carboxylic acid to form the corresponding phenol ester and rearranging the resultant phenol ester in the presence of a Friedel-Crafts catalyst to a compound of Formula I wherein $R_2$ is hydroxyl.

DETAILED DISCUSSION

Preferred compounds of this invention according to Formula I are those in which:

(a) A is furyl, thienyl, or pyrrolyl which can be substituted by one or more alkyl groups of 1–7 carbon atoms and which is attached to the carbonyl group at the 4- or 5-position;

(b) A is phenyl of Formula II wherein $R_1$ is alkyl, alkoxy, or alkylmercapto of 1–7 carbon atoms;

(c) A is phenyl of Formula II wherein $R_2$ is alkyl or alkoxy of 1–7 carbon atoms;

(d) A is phenyl or phenyl substituted by one or more alkyl groups of 1–4 carbon atoms;

(e) A is phenyl substituted by at least one of hydroxy, alkoxy, phenoxy, halogen, or alkylmercapto; and (f) A is thienyl which, together with the carbonyl group, forms a thenoyl group;

(g) A is phenyl of Formula II wherein $R_1$ is hydroxy or alkoxy of 1–7 carbon atoms and $R_2$ is halogen.

Modifications within the scope of this invention can be made, e.g., by increasing the number of carbon atoms, provided that such alterations do not adversely affect the desired properties in the resultant compound.

Specific compounds of Formula I, in addition to those shown in the examples, include:

2-(3-phenyl-2-furoyl)-5-nitrothiazole
2-(5-heptyl-2-furoyl)-5-nitrothiazole
2-(4,5-dimethyl-2-furoyl)-5-nitrothiazole
2-(3-phenyl-2-thenoyl)-5-nitrothiazole
1-methyl-2-(5-nitrothiazolyl-2-carbonyl)-3-phenyl-pyrrole
2-(2-hydroxy-4-methylbenzoyl)-5-nitrothiazole
2-(4-hydroxy-2-methylbenzoyl)-5-nitrothiazole
2-(4-hydroxy-3-methylbenzoyl)-5-nitrothiazole
2-(3-isopropyl-4-methoxybenzoyl)-5-nitrothiazole
2-(2-fluoro-4-methoxybenzoyl)-5-nitrothiazole
2-(2-fluoro-4-hydroxybenzoyl)-5-nitrothiazole
2-(3-chloro-4-hydroxybenzoyl)-5-nitrothiazole
2-(3,5-dimethyl-2-thenoyl)-5-nitrothiazole The reaction according to the first process can be conducted with or without an inert solvent, preferably with an aprotic organic solvent, e.g., carbon disulfide, methylene chloride, 1,2-dichloroethane, benzene, chlorobenzene, or nitrobenzene and at temperatures of about 0° C. to 100° C. Suitable activated functional derivatives of 5-nitrothiazole-2-carboxylic acid are the corresponding acid halides, i.e., the fluoride, chloride, bromide, or iodide, or the acid anhydride, which are more reactive towards esterification than the free acid; of these, the acid chloride is preferred. Suitable Friedel-Crafts catalysts include but are not limited to aluminum chloride, aluminum bromide, titanium tetrachloride, tin tetrachloride, anhydrous zinc chloride, boron trifluoride etherate, hydrogen fluoride, iron (III) chloride, antimony (V) chloride, etc.; of these, aluminum chloride and titanium tetrachloride are generally preferred.

The phenol esters according to the second process are prepared in the usual manner from a phenol of Formula II and an activated functional derivative of 5-nitrothiazole-2-carboxylic acid, preferably the acid halide. The phenol ester rearrangement takes place with or without an inert solvent, preferably with an aprotic solvent, e.g., nitrobenzene, carbon disulfide, or chlorobenzene. Preferred Friedel-Crafts catalysts for the rearrangement are boron trifluoride, hydrogen fluoride, and particularly aluminum chloride. The rearrangement is generally conducted at temperatures of about 0° to 200° C.

In order to produce 5-nitrothiazole-2-carboxylic acid chloride, 5 g. of 2-cyano-5-nitrothiazole described in J. Med. Chem. 12: 303 (1969) is heated with 50 ml. of concentrated hydrochloric acid for 10 minutes to the boiling point. The crystals are vacuum-filtered, suspended in 24 ml. of concentrated sulfuric acid, and, under ice cooling, 8 ml. of a 50% (g./v.) aqueous sodium nitrite solution is gradually added below the surface level of the suspension. After allowing the mixture to stand for 24 hours at room temperature, the solution is gradually poured onto ice; the crystals are vacuum-filtered and thoroughly washed with ice water. After the crystals have been dried carefully, they are dissolved in 250 ml. of absolute ether and mixed, under vigorous agitation at 0° C., with 0.45 part by weight of pyridine. Then, 0.69 part by weight of thionyl chloride is added, and the reaction mixture is stirred for 2 hours at 0° C. The crystals are vacuum-filtered under the substantial exclusion of moisture, and the filtrate is evaporated. Approximately 4.5 g. of 5-nitrothiazole-2-carboxylic acid chloride remains in the form of yellow crystals which melt at 68–72° C. under decomposition.

The nitrothiazole derivatives of this invention exhibit valuable pharmaceutical properties. Thus, they show a pronounced antimicrobial effect, specifically against yeasts, e.g., *Candida albicans* and fungi, e.g., the dermatophytes, *Trichophyton mentagrophytes* and *Trichophyton rubrum*. Moreover, the compounds of Formula I are also strongly effective antibacterial agents and are valuable intermediates for the preparation of pharmaceuticals.

As examples for the antifungal effectiveness of the compounds of Formula I, Table I sets forth the MIC (minimum inhibitory concentration) of several compounds. The commercial preparation "Asterol" and two known 5-nitrothiazole derivatives substituted in the 2-position which are described in J. Med. Chem. 12: 303 (1969) were used as comparison compounds. MIC's were determined using the serial dilution technique.

TABLE I

| A in Formula I | MIC (μg./ml.) against— | | |
|---|---|---|---|
| | Cand. alb. | Trich. ment. | Trich rubr. |
| –⟨O⟩–OH | 6.3 | 3.1 | 3.1 |
| –⟨O⟩–F | 0.4 | 1.6 | 0.8 |

TABLE I—Continued

| A in Formula I | MIC (μg./ml.) against— | | |
|---|---|---|---|
| | Cand. alb. | Trich. ment. | Trich rubr. |
| –⟨O⟩–O– | 1.6 | 3.1 | 3.1 |
| –⟨O⟩–O–CH₃ | 1.6 | 1.6 | 1.6 |
| –⟨O⟩–S– | 0.4 | 1.6 | 1.6 |
| O–CH₃ / –⟨O⟩–OCH₃ | 3.1 | 3.1 | 3.1 |
| Comparison substances: | | | |
| "Asterol" * | 300 | 50 | 50 |
| $O_2N$–⟨S,N⟩–C(=NH)(OC₂H₅) | 50 | 50 | 50 |
| $O_2N$–⟨S,N⟩–CH=N–NH=COCH₃ | 25 | 12.5 | 12.5 |

*"Asterol"=6-(2-diethylaminoethoxy)-2-dimethylaminobenzothiazole.

Due to their broad spectrum of antifungal effectiveness, the compounds of this invention are useful fungicides in both human and veterinary medicine. They can be employed, for example, in the topical therapy of mycoses, in substantially the same manner as the known compound "Asterol" (Diamthazole dihydrochloride).

The compounds of this invention can be employed in mixture with conventional excipients, i.e., pharmaceutically acceptable organic or inorganic carrier substances suitable for parenteral, enteral or topical application which do not deleteriously react with the active compounds. Suitable pharmaceutically acceptable carriers include but are not limited to water, salt solutions, alcohols, vegetable oils, polyethylene glycols, gelatin, lactose, amylase, magnesium stearate, viscous paraffin, perfume oil, fatty acid monoglycerides and diglycerides, pentaerythritol fatty acid esters, hydroxy methylcellulose, polyvinyl pyrrolidone, talc, etc.

For topical application, these are employed, in non-sprayable forms, as viscous to semi-solid or solid preparations comprising carrier material indigenous to topical formulations and having a dynamic viscosity preferably greater than water. Suitable formulations include but are not limited to solutions, suspensions, emulsions, creams, ointments, powders, liniments, salves, and the like, which are, if desired, sterilized or mixed with auxiliary agents, e.g., preservatives, stabilizers, wetting agents, buffers, or salts for influencing osmotic pressure, etc. For topical application, also suitable are sprayable aerosol preparations wherein the active ingredient, preferably in combination with a solid or liquid inert carrier material, is packaged in a squeeze bottle, or in a container in admixture with a pressurized volatile, normally gaseous propellant, e.g., a freon. Usually, the active compounds of the invention are incorporated in topical formulations in a concentration of about 0.1 to 10 weight percent.

The compounds of this invention are generally administered to animals, including but not limited to mammals, e.g., humans, livestock, household pets, etc. A fungicidally effective daily dosage of the active compounds as administered topically generally comprises about 0.1 to 10, preferably 0.5 to 5 mg./cm.², of surface area. The dose can be administered singly or as divided dosages throughout the day.

Topical administration is preferred, the compounds of this invention being particularly valuable in the treatment of animals afflicted with tinea corporis, tinea pedis, tinea manuum or tinea inguinalis.

As the compounds of this invention exhibit in contrast to the known compound "Asterol" a strong activity against yeast, e.g., *Candida albicans,* they are particularly effective against tinea diseases caused by these germs.

It will be appreciated that the actual preferred amounts of active compounds used will vary according to the specific compound being utilized, the particular compositions formulated, the mode of application, and the particular situs and organism being treated. Optimal application rates for a given set of conditions can be ascertained by those skilled in the art using conventional dosage determination tests in view of the above guidelines.

In addition to the use of these compounds for administration to mammals, they can be employed in admixture with carriers, emulsifiers, soaps, etc. for use as antiseptic solutions, e.g., in conjunction with hospital housekeeping procedures.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the following examples, the temperatures are set forth in degrees Celsius. Unless otherwise indicated, all percentages are by weight.

EXAMPLE 1

500 mg. of 5-nitrothiazole-2-carboxylic acid chloride in 5 ml. of benzene is mixed under ice cooling with 700 mg. of aluminum chloride. After agitating the reaction mixture for 5 hours at room temperature, the mixture is distributed in ethyl acetate/2N sulfuric acid. The ethyl acetate phase is washed successively with potassium bicarbonate solution, 2N sulfuric acid, and NaCl solution, dried, and concentrated by evaporation. The residue is chromatographed on 15 g. of silica gel (3% water); with toluene, 400 mg. of 2-benzoyl-5-nitrothiazole is eluted which, after recrystallization from methanol, melts at 135–136°.

EXAMPLE 2

960 mg. of 5-nitrothiazole-2-carboxylic acid chloride is mixed, in 10 ml. of toluene, with 1.32 g. of aluminum chloride. After agitating the reaction mixture for 3 hours at room temperature, it is worked up as described in Example 1, thus obtaining 700 mg. of 2-(4-toluoyl)-5-nitrothiazole which, after recrystallization from ethanol, melts at 158–160°.

EXAMPLE 3

One gram of 5-nitrothiazole-2-carboxylic acid chloride in 6.6 ml. of methylene chloride is mixed with 765 mg. of n-butyl-benzene and thereafter, at room temperature, with 1.4 g. of aluminum chloride. After 3 hours of agitation at room temperature, the reaction mixture is worked up as set forth in Example 1, thus producing 210 mg. of 2-(4-n-butylbenzoyl)-5-nitrothiazole, m.p. 64–65°.

EXAMPLE 4

One gram of 5-nitrothiazole-2-carboxylic acid chloride in 6.6 ml. of methylene chloride is mixed with 600 mg. of o-xylene and then with 1.4 g. of aluminum chloride. After agitating the reaction mixture for 3 hours at room temperature, it is worked up as described in Example 1; the crude product is crystallized from methanol with the addition of activated carbon, thus obtaining 343 mg. of 2-(3,4-dimethylbenzoyl)-5-nitrothiazole, m.p. 154–155°.

EXAMPLE 5

1.8 g. of 5-nitrothiazole-2-carboxylic acid chloride in 10 ml. of carbon disulfide is mixed with 1.2 g. of anisole and then with 3 g. of aluminum chloride. After the addition of 20 ml. of 1,2-dichloroethane, the reaction mixture is stirred overnight and worked up as set forth in Example 1. By chromatographing the crude product on 100 g. of silica gel (3% water) and elution with toluene, 600 mg. of 2-anisoyl-5-nitrothiazole is obtained, m.p. 155–156°; and by elution with toluene-ethyl acetate (6:4), 900 mg. of 2-(4-hydroxybenzoyl)-5-nitrothiazole is produced, m.p. 185° after recrystallization from methanol.

EXAMPLE 6

500 mg. of 5-nitrothiazole-2-carboxylic acid chloride in 3.1 ml. of methylene chloride is mixed with 450 mg. of n-butyl-phenyl ether and thereafter with 340 mg. of aluminum chloride. After agitating the reaction mixture for 10 minutes at room temperature, it is worked up as disclosed in Example 1. The crude product is recrystallized from methanol, thus obtaining 214 mg. of 2-(4-n-butyloxybenzoyl)-5-nitrothiazole, m.p. 107–108°.

EXAMPLE 7

One gram of 5-nitrothiazole-2-carboxylic acid chloride in 6.6 ml. of methylene chloride is mixed with 970 mg. of diphenyl ether and then with 1.4 g. of aluminum chloride. After agitating the mixture for 3 hours at room temperature, it is worked up as described in Example 1. By chromatography of the crude product on 10 g. of silica gel (3% water), upon elution with toluene, 1.1 g. of 2-(4-phenoxybenzoyl)-5-nitrothiazole is produced which melts, after recrystallization from methanol, at 145–147°.

EXAMPLE 8

One gram of 5-nitrothiazole-2-carboxylic acid chloride in 6.6 ml. of methylene chloride is mixed with 790 mg. of veratrole and subsequently with 1.4 g. of aluminum chloride. After three hours of agitation at room temperature, the reaction mixture is worked up as described in Example 1. After washing with pentane, the crude product is recrystallized from ethanol, thus obtaining 110 mg. of 2-(3,4-dimethoxybenzoyl)-5-nitrothiazole, m.p. 148–149°.

EXAMPLE 9

One gram of 5-nitrothiazole-2-carboxylic acid chloride in 6.6 ml. of methylene chloride is mixed with 800 mg. of 2-methyl-anisole and thereupon with 1.6 g. of aluminum chloride. After stirring the reaction mixture for 1.5 hours at room temperature, it is worked up as set forth in Example 1. The crude product is washed with pentane and recrystallized from methanol, thus producing 620 mg. of 2-(3-methyl-4-methoxybenzoyl)-5-nitrothiazole, m.p. 150–152°.

EXAMPLE 10

One gram of 5-nitrothiazole-2-carboxylic acid chloride in 6.6 ml. of methylene chloride is mixed with 700 mg. of thioanisole and then with 1.6 g. of aluminum chloride. After agitating the reaction mixture for 30 minutes at room temperature, it is worked up as set forth in Example 1. After treatment with activated carbon in methanol, 300 mg. of crystals is obtained from the crude product which, after another recrystallization, yields pure 2-(4-methylmercaptobenzoyl)-5-nitrothiazole, m.p. 159–160°.

EXAMPLE 11

One gram of 5-nitrothiazole-2-carboxylic acid chloride in 6.6 ml. of methylene chloride is mixed with 700 mg. of 3-methoxyphenol and then with 1.4 g. of aluminum chloride. After stirring for 3 hours at room temperature, the reaction mixture is worked up as disclosed in Example 1, and after recrystallization from methanol, one obtains 300 mg. of 2-(2-hydroxy-4-methoxybenzoyl)-5-nitrothiazole, m.p. 221–223°.

EXAMPLE 12

One gram of 5-nitrothiazole-2-carboxylic acid chloride in 6.6 ml. of methylene chloride is mixed with 0.6 ml. of fluorobenzene and thereafter with 1.6 g. of aluminum chloride. After agitating the reaction mixture overnight, it is worked up as described in Example 1. The crude product is distilled with the use of a bulb tube at 160°/0.01 torr (mm. Hg) and thereafter recrystallized from methanol, yielding 200 mg. of 2-(4-fluorobenzoyl)-5-nitrothiazole, m.p. 127–129°.

EXAMPLE 13

One gram of 5-nitrothiazole-2-carboxylic acid chloride in 10 ml. of 2-chlorotoluene is mixed with 2.8 g. of aluminum chloride. The mixture is agitated overnight at room temperature and then worked up as set forth in Example 1. The product is distilled by means of a bulb tube (150–180°/0.01 torr) and then recrystallized from methanol, thus resulting in 66 mg. of 2-(3-chloro-4-methylbenzoyl)-5-nitrothiazole, m.p. 110–112°.

EXAMPLE 14

100 mg. of 5-nitrothiazole-2-carboxylic acid chloride in 0.66 ml. of methylene chloride is mixed with 70 mg. of 2-fluoroanisole and then with 140 mg. of aluminum chloride. After stirring the reaction mixture for 3 hours at room temperature, it is worked up as described in Example 1. The crystals separated from the thus-obtained oily crude product are vacuum-filtered, thus obtaining 10 mg. of 2-(3-fluoro-4-methoxybenzoyl)-5-nitrothiazole, m.p. 116–118°.

EXAMPLE 15

860 mg. of 5-nitrothiazole-2-carboxylic acid chloride in 10 ml. of methylene chloride, 310 mg. of furan in 4.5 ml. of methylene chloride, and 860 mg. of titanium tetrachloride in 4.5 ml. of methylene chloride are combined, agitated for 1 hour at room temperature, and the mixture is then worked up as set forth in Example 1. The crude product is sublimed under a vacuum (0.1 torr) at 140°, thus producing 350 mg. of 2-(2-furoyl)-5-nitrothiazole, m.p. 179°.

EXAMPLE 16

One gram of 5 - nitrothiazole - 2 - carboxylic acid chloride in 12 ml. of methylene chloride is mixed with 430 mg. of 2 - methylfuran in 5 ml. of methylene chloride and thereafter with 1 g. of titanium tetrachloride in 5.3 ml. of methylene chloride. After agitating the reaction mixture for 1 hour at room temperature, it is worked up as disclosed in Example 1. The crude product is distilled by means of a bulb tube at 170°/0.05 torr and then recrystallized from ethanol, yielding 250 mg. of 2 - (5-methyl-2-furoyl)-5-nitrothiazole, m.p. 162–163°.

EXAMPLE 17

5 g. of 5 - nitrothiazole - 2 - carboxylic acid chloride in 66 ml. of methylene chloride is mixed with 2.4 g. of thiophene and then, under ice cooling, with 5 g. of titanium tetrachloride in 26 ml. of methylene chloride. After stirring for 2.5 hours at room temperature, the mixture is worked up in accordance with Example 1. After distillation by a bulb tube (150°/0.01 torr) and recrystallization from methanol, 2.75 g. of 2-(2-thenoyl)-5-nitrothiazole is produced, m.p. 160–165°.

EXAMPLE 18

2 g. of 5 - nitrothiazole-2-carboxylic acid chloride in 23 ml. of benzene is mixed with 880 mg. of thiophene and then, under ice cooling, with 2 g. of titanium tetrachloride. The mixture is agitated for 2 hours at room temperature and worked up as set forth in Example 17, thus obtaining 600 mg. of 2-(2-thenoyl)-5-nitrothiazole, m.p. 160–165°.

EXAMPLE 19

500 mg. of 5 - nitrothiazole - 2 - carboxylic acid chloride in 5 ml. of nitrobenzene is mixed with 220 mg. of thiophene and then, under ice cooling, with 1.4 g. of aluminum chloride. Thereafter, the reaction mixture is stirred for 3 hours at room temperature and further treated as described in Example 17, thus producing 110 mg. of 2-(2-thenoyl)-5-nitrothiazole, m.p. 160–165°.

EXAMPLE 20

500 mg. of 5 - nitrothiazole - 2 - carboxylic acid chloride in 5 ml. of nitrobenzene is mixed with 220 mg. of thiophene and then with 1.4 g. of aluminum chloride. The mixture is heated for 15 minutes to 80° and then worked up as described in Example 17. In this way, 90 mg. of 2 - (2 - thenoyl) - 5 - nitrothiazole is obtained, m.p. 160–165°.

EXAMPLE 21

One gram of 5 - nitrothiazole - 2 - carboxylic acid chloride in 12 ml. of methylene chloride is mixed with 510 mg. of 2-methylthiophene and thereupon with 1 g. of titanium tetrachloride in 5 ml. of methylene chloride. After agitating for 1 hour at room temperature, the mixture is worked up according to Example 1. Upon recrystallization from ethanol/chloroform (5:1), one obtains 1.04 g. of 2 - (5 - methyl - 2 - thenoyl)-5-nitrothiazole, m.p. 154–156°.

EXAMPLE 22

One gram of 5 - nitrothiazole - 2 - carboxylic acid chloride in 6.6 ml. of methylene chloride is mixed with 500 mg. of 1 - methyl-pyrrole and then with 1.6 g. of aluminum chloride. After stirring for 3 hours at room temperature, the reaction mixture is worked up as described in Example 1. Upon sublimation at 170°/0.01 torr, 400 mg. of 1 - methyl - 2-(5-nitro-2-thiazolylcarbonyl)-pyrrole is produced, m.p. 180–182°.

EXAMPLE 23

One gram of 5 - nitrothiazole - 2 - carboxylic acid chloride in 6.6 ml. of methylene chloride is added dropwise to a solution of 490 mg. of phenol in 5 ml. of pyridine at 0°. The mixture is agitated overnight, and then distributed in ethyl acetate/2N sulfuric acid; the organic phase is washed with potassium bicarbonate solution and NaCl solution. After drying and evaporation, 950 mg. of the phenyl ester of 5-nitrothiazole-2-carboxylic acid is obtained, m.p. 104–106°. This product is dissolved in 10 ml. of nitrobenzene, mixed with 750 mg. of aluminum chloride, and heated to 140° for 3 hours. Then, the solvent is evaporated under vacuum and the residue distributed in ethyl acetate/2N sulfuric acid. After washing with potassium bicarbonate solution and NaCl solution, the organic phase is dried and evaporated. The residue is recrystallized from methanol with the addition of activated carbon, thus obtaining 400 mg. of 2-(4-hydroxybenzoyl)-5-nitrothiazole, m.p. 184–185°.

EXAMPLE 24

One gram of 5 - nitrothiazole - 2 - carboxylic acid chloride in 6.6 ml. of methylene chloride is reacted with 650 mg. of 3-methoxyphenol, as set forth in Example 23. The crude phenol ester is treated with 500 mg. of aluminum chloride, as described in Example 23. After conducting a working-up operation as set forth in Example 20, 250 mg. of 2 - (2 - hydroxy-4-methoxybenzoyl)-5-nitrothiazole is produced, m.p. 220–222°.

EXAMPLE 25

One gram of 5 - nitrothiazole - 2 - carboxylic acid chloride in 6.2 ml. of methylene chloride is mixed with 570 mg. of 1,3-dihydroxybenzene and thereafter with 1.4 g. of aluminum chloride. After 3 hours of agitation at room temperature, the reaction mixture is worked up as described in Example 1. The crude product is chromatographed on 12 times the amount of silica gel (3% water). With toluene/ethyl acetate (9:1), 300 mg. of 2 - (2,4-dihydroxy-benzoyl) - 5 - nitrothiazole is eluted which, after recrystallization from methanol/chloroform, melts at 244–253° (under decomposition).

EXAMPLE 26

One gram of 5 - nitrothiazole - 2 - carboxylic acid chloride in 6.2 ml. of methylene chloride is mixed with 740 mg. of 1 - phenyl-pyrrole and thereafter with 1.4 g. of aluminum chloride. After agitating the mixture for 3 hours at room temperature, it is worked up as set forth in Example 1. By recrystallization of the crude product from acetone/methanol, 127 mg. of 1 - phenyl - 2 - (5-nitro - 2 - thiazolylcarbonyl) - pyrrole is produced, m.p. 175–176°.

EXAMPLE 27

One gram of 5 - nitrothiazole - 2 - carboxylic acid chloride in 6.2 ml. of methylene chloride is mixed with 510 mg. of 3 - methylthiophene and subsequently with 1.4 g. of aluminum chloride. After stirring the reaction mixture for 3 hours at room temperature, it is worked up according to Example 1, thus obtaining a crude product which is chromatographed on silica gel (10 g.; 3% water content); the eluent is toluene. After recrystallization from chlorofrom/methanol, 528 mg. of 2-(3-methyl-2-thenoyl)-5-nitrothiazole is obtained, m.p. 189–190°.

EXAMPLE 28

One gram of 5-nitrothiazole - 2 - carboxylic acid chloride in 12 ml. methylene chloride is mixed with 740 mg. of 2-phenylpyrrole and subsequently with 1.4 g. of aluminium chloride. After stirring the reaction mixture for 3 hours at room temperature, it is worked up according to Example 1, thus obtaining a crude product, which after recrystallization from chloroform/methanol (1:1) produces 108 mg. of 2 - phenyl - 5 - (5-nitro-2-thiazolylcarbonyl)-pyrrole, m.p. 265–260°.

EXAMPLE 29

One gram of 5-nitrothiazole - 2 - carboxylic acid chloride in 12 ml. methylene chloride is mixed with 580 mg. 2,5-dimethylthiophene and subsequently with 1 g. titanium tetrachloride. After stirring the reaction mixture for one hour at room temperature, it is worked up according to Example 1, thus obtaining 1 g. of crude crystals, which after recrystallization from chloroform/methanol (1:1) yields 816 mg. of pure 2-(2,5 - dimethyl-3-thenoyl)-5-nitrothiazole, m.p. 142–144°.

EXAMPLE 30

One gram of 5 - nitrothiazole - 2 - carboxylic acid chloride in 12 ml. methylene chloride is mixed with 490 mg. 2,5-dimethyl-pyrrole and subsequently with 1.4 g. aluminium chloride. After stirring the mixture for 3 hours at room temperature, it is worked up according to Example 1, thus obtaining a crude crystalline product. After sublimation by a bulb tube (180°/0.01 torr) 47 mg. 2,5 - dimethyl - 3 - (5-nitro-2-thiazolylcarbonyl)-pyrrole is obtained, m.p. 287–288°.

EXAMPLE 31

One gram of 5-nitrothiazole-2-carboxylic acid chloride in 6.2 ml. methylene chloride is mixed with 970 mg. diphenylsulfide and subsequently with 1.4 g. aluminium chloride. After stirring the reaction mixture for 3 hours at room temperature, it is worked up according to Example 1. The crude product is chromatographed on 20 times the amount of silica gel (3% water). With toluene 110 mg. of a yellow oil is eluted, which after recrystallization from chloroform/methanol (1:1) yields 40 mg. of pure 2 - (4 - phenylmercaptobenzoyl) - 5 - nitrothiazole, m.p. 147–150°.

EXAMPLE 32

One gram of 5-nitrothiazole-2-carboxylic acid chloride in 12 ml. methylene chloride is mixed with 635 mg. 4-methyl-anisole and subsequently with 1.4 g. aluminium chloride. After stirring the reaction mixture for 3 hours at room temperature, it is worked up according to Example 1, obtaining 1.1 g. of a crude oil, which after washing with pentane and recrystallization from chloroform/methanol (1:1) produces 419 mg. of pure 2-(2-methoxy-5-methylbenzoyl)-5-nitrothiazole, m.p. 86–88°.

EXAMPLE 33

500 mg. 5-nitrothiazole - 2 - carboxylic acid chloride in 6 ml. methylene chloride is mixed with 370 mg. 2-chloroanisole and subsequently with 700 mg. aluminium chloride. After stirring the reaction mixture for 5 hours at room temperature, it is worked up according to Example 1, thus yielding 800 mg. of a crude product, which after washing with pentane and recrystallization from chloroform/methanol (1:1) produces 147 mg. of pure 2-(3-chloro-4-methoxybenzoyl) - 5 - nitrothiazole, m.p. 122–125°.

EXAMPLE 34

One gram 5-nitrothiazole-2-carboxylic acid chloride in 12 ml. methylene chloride is mixed with 570 mg. 2-fluorotoluene and subsequently with 1.4 g. aluminium chloride. After stirring the reaction mixture at room temperature for 3 hours it is worked up according to Example 1, thus obtaining 400 mg. of an oily product, which is recrystallized from chloroform/methanol (1:1) to yield 170 mg. of pure 2-(3-methyl-4-fluorobenzoyl)-5-nitrothiazole, m.p. 104–105°.

EXAMPLE 35

One gram 5-nitrothiazole-2-carboxylic acid chloride is mixed with 635 mg. 3-methylanisole and subsequently with 1.4 g. aluminium chloride. After stirring the reaction mixture for 3 hours at room temperature, it is worked up according to Example 1, thus yielding 1.4 g. yellow crystals, which are a mixture of both isomers: 2-(2-methoxy-4-methylbenzyl) - 5 - nitrothiazole and 2-(2-methyl-4-methoxybenzoyl)-5-nitrothiazole. The isomers are separated by recrystallization from chloroform/methanol (1:1), thus obtaining one isomer, m.p. 139–141° (231 mg.), and by distillation of the mother liquor of this crystallization by a bulb tube (180°/0.01 torr) and recrystallization of the distilled product from chloroform/methanol (1:1) the second isomer, m.p. 79–80° (331 mg.).

EXAMPLE 36

Ointment for external application having the following composition:

|  | Percent |
|---|---|
| 2-(2-Thenoyl)-5-nitrothiazole | 0.50 |
| Beeswax, white, D.A.B. (German Pharmacopoeia) 6 | 5.00 |
| Lanolin, anhydrous, D.A.B. 6 | 5.00 |
| Vaseline, white, D.A.B. 6 | 20.00 |
| Amphocerin K "Dehydag" | 25.00 |
| Paraffin, liquid, D.A.B. 6 | 14.48 |
| Water, desalinated | 30.00 |
| Chypre No. 6466, Haarmann & Reimer | 0.02 |

EXAMPLE 37

Ointment for external application having the following composition:

|  | Percent |
|---|---|
| 2-(4-hydroxybenzoyl)-5-nitrothiazole | 1.00 |
| Beeswax, white, D.A.B. 6 | 5.00 |
| Lanolin, anhydrous, D.A.B. 6 | 5.00 |
| Vaseline, white, D.A.B. 6 | 20.00 |
| Amphocerin K "Dehydrag" | 25.00 |
| Paraffin, liquid, D.A.B. 6 | 13.98 |
| Water, desalinated | 30.00 |
| Chypre No. 6466, Haarmann & Reimer | 0.02 |

Analogously to Example 1, the following compounds can furthermore be prepared:

2-(5-phenyl-2-furoyl)-5-nitrothiazole
2-(2,5-dimethyl-3-furoyl)-5-nitrothiazole
2-(5-phenyl-2-thenoyl)-5-nitrothiazole
2-(5-nirto-2-thiazolylcarbonyl)-pyrrole 2-(3,4-difluorobenzoyl)-5-nitrothiazole
2-(4-n-heptylbenzoyl)-5-nitrothiazole
2-(2,5-di-n-heptylbenzoyl)-5-nitrothiazole
2-(3,3-dihydroxybenzoyl)-5-nitrothiazole
2-(2,5-dihydroxybenzoyl)-5-nitrothiazole
2-(4-phenylbenzoyl)-5-nitrothiazole
2-(4-phenylmethylbenzoyl)-5-nitrothiazole
2-(4-phenylethylbenzoyl)-5-nitrothiazole
2-(3-fluoro-4-hydroxybenzoyl)-5-nitrothiazole
2-(2-hydroxy-5-methylbenzoyl)-5-nitrothiazole The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modification of the invention to adapt it to various usages and conditions.

What is claimed is:

1. A 2-acyl-5-nitrothiazole of the formula

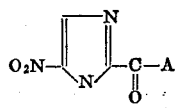

wherein A is furyl, thienyl or pyrrolyl, unsubstituted or substituted by at least one alkyl of 1–7 carbon atoms or by phenyl, or a phenyl group of the formula

wherein $R_1$ is hydrogen, halogen, alkyl of 1–7 carbon atoms, hydroxy, alkoxy of 1–7 carbon atoms, phenoxy, alkylmercapto of 1–7 carbon atoms, phenylmercapto, phenyl or phenylalkyl of 1–4 carbon atoms in the alkyl group; and $R_2$ is hydrogen, halogen, alkyl of 1–7 carbon atoms, hydroxy, or alkoxy of 1–7 carbon atoms.

2. A compound of Claim 1, wherein A is said unsubstituted or substituted furyl, thienyl or pyrrolyl attached at the 5-position.

3. A compound of Claim 2, wherein A is thienyl.

4. A compound of Claim 1, wherein A is phenyl, $R_1$ is hydroxy or alkoxy of 1–7 carbon atoms and $R_2$ is halogen.

5. A compound of Claim 1, wherein A is phenyl and $R_2$ is alkyl or alkoxy of 1–7 carbon atoms.

6. A compound of Claim 1, wherein A is phenyl and at least one of $R_1$ and $R_2$ is alkyl of 1–4 carbon atoms.

7. A compound of Claim 1, wherein A is phenyl and at least one of $R_1$ and $R_2$ is hydroxy, alkoxy, phenoxy, halogen, or alkylmercapto.

8. A compound of Claim 1, wherein A is furyl, thienyl or pyrrolyl attached to the carbonyl group at the 4- or 5-position, and wherein A is unsubstituted or substituted by one or more alkyl groups of 1–7 carbon atoms.

9. A compound of Claim 1, wherein A is phenyl and $R_1$ is alkyl, alkoxy, or alkylmercapto of 1–7 carbon atoms.

10. A compound of Claim 1, wherein A is phenyl and $R_2$ is alkyl or alkoxy of 1–7 carbon atoms.

11. A compound of Claim 1, wherein A is phenyl or phenyl substituted by one or more alkyl groups of 1–4 carbon atoms.

12. A compound of Claim 1, wherein A is phenyl substituted by at least one of hydroxy, alkoxy, phenoxy, halogen or alkylmercapto.

13. A compound of Claim 1, wherein A is thienyl which, together with the carbonyl group, forms a thenoyl group.

14. A compound of Claim 1, wherein A is phenyl, $R_1$ is hydroxy or alkoxy of 1–7 carbon atoms and $R_2$ is halogen.

15. A compound of Claim 1, 2-benzoyl-5-nitrothiazole.
16. A compound of Claim 1, 2-(4-toluoyl)-5-nitrothiazole.
17. A compound of Claim 1, 2-(4-n-butylbenzoyl)-5-nitrothiazole.
18. A compound of Claim 1, 2-(3,4-dimethylbenzoyl)-5-nitrothiazole.
19. A compound of Claim 1, 2-anisoyl-5-nitrothiazole.
20. A compound of Claim 1, 2-(4-hydroxybenzoyl)-5-nitrothiazole.
21. A compound of Claim 1, 2-(4-n-butyloxybenzoyl)-5-nitrothiazole.
22. A compound of Claim 1, 2-(4-phenoxybenzoyl)-5-nitrothiazole.
23. A compound of Claim 1, 2-(3,4-dimethoxybenzoyl)-5-nitrothiazole.
24. A compound of Claim 1, 2-(3-methyl-4-methoxybenzoyl)-5-nitrothiazole.
25. A compound of Claim 1, 2-(4-methylmercaptobenzoyl)-5-nitrothiazole.
26. A compound of Claim 1, 2-(2-hydroxy-4-methoxybenzoyl)-5-nitrothiazole.
27. A compound of Claim 1, 2-(4-fluorobenzoyl)-5-nitrothiazole.
28. A compound of Claim 1, 2-(3-chloro-4-methylbenzoyl)-5-nitrothiazole.
29. A compound of Claim 1, 2-(3-fluoro-4-methoxybenzoyl)-5-nitrothiazole.
30. A compound of Claim 1, 2-(2-furoyl)-5-nitrothiazole.
31. A compound of Claim 1, 2-(5-methyl-2-furoyl)-5-nitrothiazole.
32. A compound of Claim 1, 2-(2-thenoyl)-5-nitrothiazole.
33. A compound of Claim 1, 2-(5-methyl-2-thenoyl)-5-nitrothiazole.
34. A compound of Claim 1, 1-methyl-2-(5-nitro-2-thiazolylcarbonyl)-pyrrole.
35. A compound of Claim 1, 2-(2,4-dihydroxybenzoyl)-5-nitrothiazole.
36. A compound of Claim 1, 2-phenyl-5-(5-nitro-2-thiazolylcarbonyl)-pyrrole.
37. A compound of Claim 1, 2-(2,5-dimethyl-3-thenoyl)-5-nitrothiazole.
38. A compound of Claim 1, 2,5-dimethyl-3-(5-nitro-2-thiazolylcarbonyl)-pyrrole.
39. A compound of Claim 1, 2-(4-phenylmercaptobenzoyl)-5-nitrothiazole.
40. A compound of Claim 1, 2-(2-methoxy-5-methylbenzoyl)-5-nitrothiazole.
41. A compound of Claim 1, 2-(3-chloro-4-methoxybenzoyl)-5-nitrothiazole.
42. A compound of Claim 1, 2-(3-methyl-4-fluorobenzoyl)-5-nitrothiazole.
43. A compound of Claim 1, 2-(2-methoxy-4-methylbenzoyl)-5-nitrothiazole.
44. A compound of Claim 1, 2-(2-methyl-4-methoxybenzoyl)-5-nitrothiazole.

References Cited

UNITED STATES PATENTS 3,472,864  10/1969  Henry et al. _____ 260—302 R

FOREIGN PATENTS 2,013,463  10/1963  Japan _____ 260—302 R
1,934,066  11/1966  Japan _____ 260—302 R

OTHER REFERENCES

Wagner et al., *Synthetic Organic Chemistry*, John Wiley & Sons, N.Y., 1953, pp. 317–23, 344, 481–2.

RICHARD J. GALLAGHER, Primary Examiner

U.S. Cl. X.R.

260—302 R; 424—270

UNITED STATES PATENT OFFICE
CERTIFICATE OF CORRECTION

Patent No. 3,830,826      Dated August 20, 1974

Inventor(s) Peter Strehlke, et al.

It is certified that error appears in the above-identified patent and that said Letters Patent are hereby corrected as shown below:

IN THE HEADING, COLUMN 1: The Assignee of Record should read -- Schering Aktiengesellschaft, Berlin and Bergkamen, Federal Republic of Germany --.

Signed and sealed this 3rd day of December 1974.

(SEAL)
Attest:

McCOY M. GIBSON JR.
Attesting Officer

C. MARSHALL DANN
Commissioner of Patents